Figure 1:
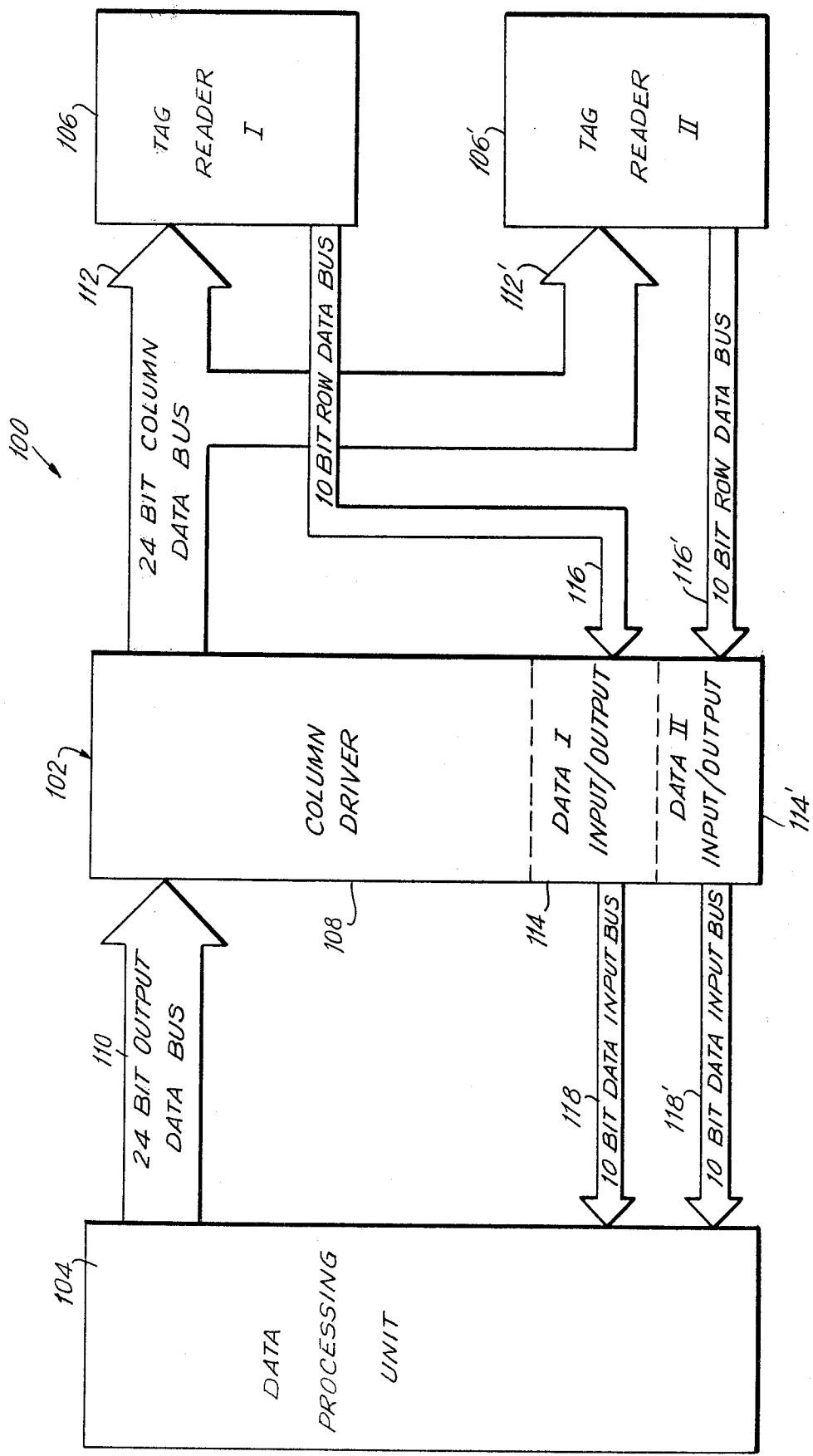

United States Patent [19]

Perry

[11] 4,336,449
[45] Jun. 22, 1982

[54] INTERFACE UNIT

[75] Inventor: Russell C. Perry, St. James, N.Y.

[73] Assignee: George F. Heinrich, Bayside, N.Y.

[21] Appl. No.: 179,660

[22] Filed: Aug. 19, 1980

[51] Int. Cl.³ ............................................. G06K 7/10
[52] U.S. Cl. ................................... 235/429; 235/438;
235/454; 235/458
[58] Field of Search ............... 235/435, 438, 429, 454,
235/456, 458, 461, 489; 365/201, 206, 215, 220,
189, 230

[56] References Cited
U.S. PATENT DOCUMENTS

| 3,727,201 | 4/1973 | Ho et al. | 365/189 |
| 3,941,979 | 3/1976 | Cragon | 365/215 |
| 3,961,160 | 6/1976 | Gorgens | 235/458 |
| 4,046,995 | 9/1977 | Salley | 365/201 |
| 4,055,754 | 10/1977 | Chesley | 365/201 |
| 4,156,819 | 5/1979 | Takahashi et al. | 365/201 |
| 4,200,919 | 4/1980 | Page et al. | 365/189 |

Primary Examiner—Donald J. Yusko

Attorney, Agent, or Firm—Amster, Rothstein & Engelberg

[57] ABSTRACT

A garment tag reading system which includes a Kimball tag reader and a data processing unit is described for reading and decoding information encoded on a garment tag. An interface unit is used to permit direct communication between the tag reader, which has a memory for storing the coded information read from the garment tag, and the data processing unit. The interface unit includes a column driver having a plurality of low voltage amplifiers which provide amplified output voltages in response to voltage-level increases caused by the programmed operation of the data processing unit. The output voltages are serially applied to the tag reader memory for interrogating the memory to retrieve the coded information. The information from the tag reader memory is received by a data input/output circuit in the interface unit in the form of decimal coded output voltages and is subsequently entered into the data processing unit for decoding into a readable format.

6 Claims, 3 Drawing Figures

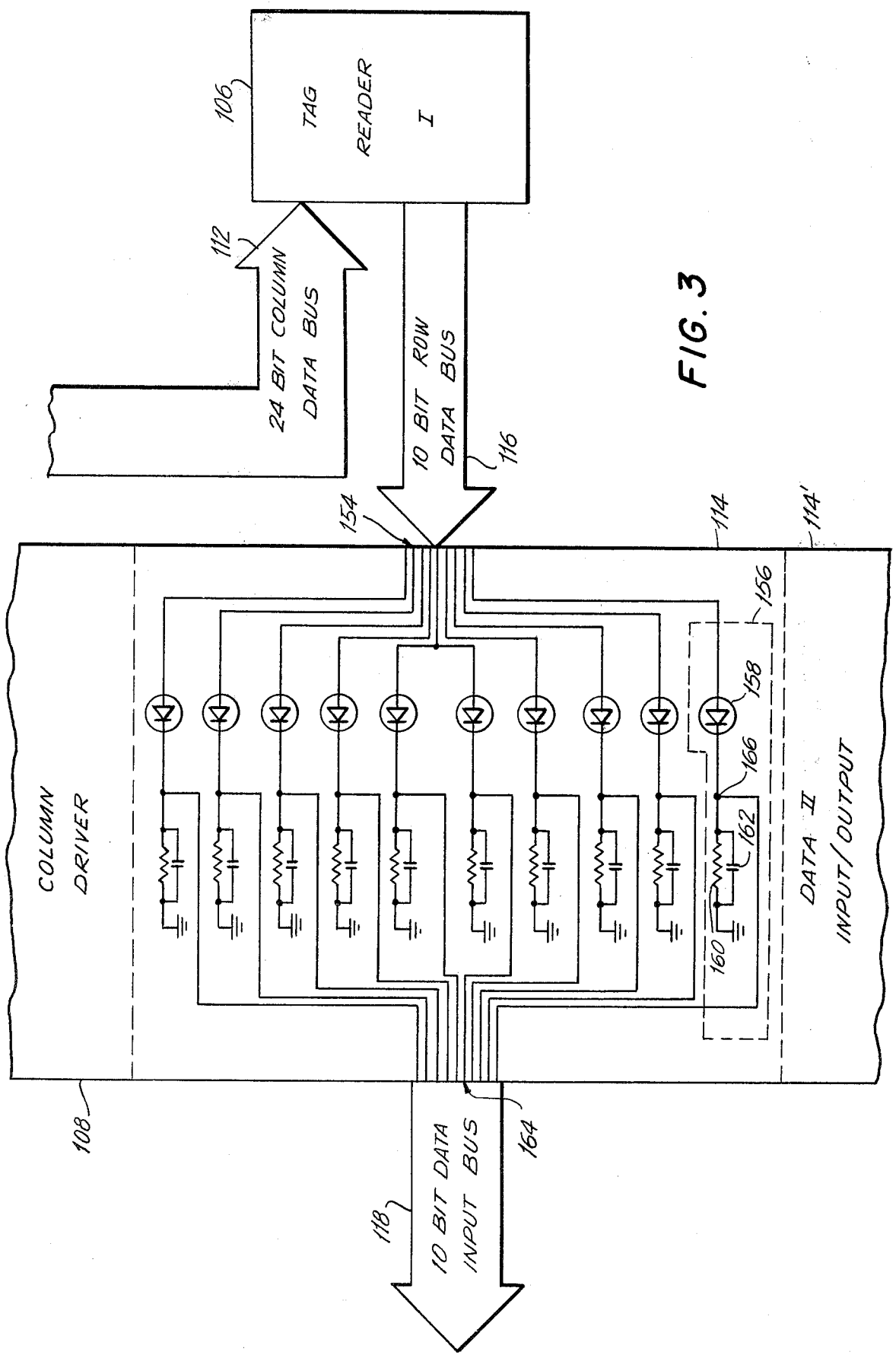

INTERFACE UNIT

DESCRIPTION OF THE INVENTION

This invention relates in general to a garment tag reading system, and more particularly, to an interface unit which permits the direct communication between a Kimball tag reader and a data processing unit.

In the retail garment industry, it is common practice to use what is referred to as print-punch tickets or garment tags, from which the retailer can derive a substantial amount of information. Each garment tag can selectively include a variety of information encoded in binary code as punched openings in the tag arranged in a 24 column by 5 row matrix. The coded information can provide the retailer with such information as the manufacturer's product code, the unit price of each garment, the cost of each garment to the retailer, and season codes indicating when to pull or mark-down each garment. However, before the coded information can be used by the retailer, the information must be read from the garment tag and then decoded into a readable format which is understandable by the retailer.

Heretofore, decoding of the information on the garment tag required the use of a conventional Kimball tag reader having a storage memory, an IBM summary punch, IBM data cards, and a data processing unit. The Kimball tag reader is used to read the punched openings on the garment tag, to convert the coded information from the binary code to a decimal code, and to temporarily store the information in decimal code within its memory. However, the tag reader memory has a limited capacity, sufficient to store the coded information from only one tag. Therefore, after each tag is read, the coded information must be retrieved from the tag reader memory and reproduced on another media before the next tag can be read. In a typical installation, an IBM summary punch is connected to the Kimball tag reader for producing a conventional IBM data card having punched openings in decimal code corresponding to the coded information stored within the tag reader memory. The IBM data cards are then fed into a data processing unit, such as an IBM Series/1 computer, in a conventional manner for decoding the information from the IBM data cards into a readable format.

As thus described, the coded information from the tag must be first read, converted from binary to decimal code, and stored in the tag reader memory. The tag reader memory is the functional equivalent of a switching matrix arranged in 24 columns by 10 rows where each column of the tag reader memory corresponds to one column on the garment tag and each row represents a decimal number, i.e., 0 through 9. A bank of electromechanical relays having electrical contacts are arranged within the tag reader memory to first convert the binary coded information into decimal code and to then store the information in decimal code. To this end, the information from each column on the garment tag is read and stored in the tag reader memory by closing the electrical contact within the matrix which provides a connection between that column and the row which corresponds to the numerical value of the information in that column in decimal code, i.e., 0 through 9.

After a tag is read, the tag reader memory is interrogated to retrieve the information in decimal code, row-by-row, by indexing the IBM data cards one row at a time through the IBM summary punch. The IBM summary punch is wired in parallel to the columns in the tag reader memory and includes a solenoid punch for each column on the tag. The IBM summary punch produces a punched opening into the IBM data card corresponding to the closed electrical contacts in the tag reader memory.

This row-by-row method of interrogating the tag reader memory is required for operation with the IBM summary punch. However, it is generally unsatisfactory, particularly when the coded information is to be recorded on other media or transferred directly into a data processing unit. For example, the row-by-row interrogation of the tag reader memory produces a 24 column by 10 row matrix in the data processing unit's memory which, in addition to being memory consumptive, requires substantial memory allocation for the matrix processing subroutines needed to extract the coded information in the manner required for subsequent processing. The construction and dissolution of the data processing unit's memory matrix requires significant CPU time, a factor which imposes a limitation on the number of Kimball tag readers theat can be processed by a single data processing unit.

Further, often the retailer desires to use the first column on the garment tag as a control or flag to signal special instructions to the data processing unit. In this manner, when the retailer desires the data processing unit to branch to an appropriate subroutine for special instructions, such as when beginning a new batch of garment tags, the control column must be interrogated first to detect the presence or absence of such a control or flag signal. However, the row-by-row method of interrogating the tag reader memory according to the present known garment tag reading system, makes it impossible to determine the numerical value in any column until the entire memory has been interrogated.

Still further, a medium-sized retail clothing chain might use 5,000,000 IBM data cards a year. Eliminating the cost of these data cards, the IBM summary punches, and the various supporting personnel, would affect a substantial economic savings. Even still further, it is often found that the contacts within the electromechanical relay of the tag reader memory become pitted, worn or dirty from continuous use. As a result of this condition, the low voltages obtainable at the output stage of known data processing units become generally insufficient to interrogate the tag reader memory through these contacts, and to subsequently operate the solenoid punches in the IBM summary punch.

Thus, there is a need for a garment tag reading system which can read and decode the coded information provided on a garment tag as punched openings without the need for the use of an IBM summary punch and the production of associated IBM data cards, and more particularly, for an interface unit which permits the direct communication between the tag reader and the data processing unit.

It is broadly an object of the present invention to provide a garment tag reading system comprising a tag reader and a data processing unit which are operatively connected by an interface unit, such system being designed to overcome or avoid one or more of the foregoing disadvantages resulting from the use of conventional garment tag reading systems. Specifically, the present invention provides an interface unit for use in a tag reading system which permits the direct communication between the tag reader memory, such as a Kimball tag reader, and a data processing unit, such as an IBM Series/1 computer.

A further object of the present invention is to provide an interface unit which provides voltage level compatability and electronic buffering between a Kimball tag reader and a data processing unit.

A still further object of the present invention is to provide an interface unit which enables the data processing unit to retrieve the coded information stored in the memories of a plurality of Kimball tag readers by the use of a single interface unit, column-by-column.

It is still another object of the present invention to provide an interface unit which can perform a diagnostic function whereby the source of malfunctions in the garment tag reading system can be isolated.

Even still further, another object of the present invention is to provide an interface unit which interrogates the tag reader memory column-by-column such that a control or flag signal present within the first column of the memory is detected to enable the data processing to immediately carry out the instructions required by the control or flag signals.

In accordance with one embodiment of the present invention, there is provided a tag reading system for reading coded information obtained from a perforated punched garment tag and for decoding the information into a readable format. The system includes a tag reader having a memory arranged into columns and rows. The tag reader reads the coded information from the garment tag and stores the information in its memory. Means are provided for retrieving the information from the tag reader memory by sequentially applying interrogating signals to the memory. Further, means are provided for receiving from the tag reader signals responsive to the interrogating signals and for entering the responsive signals into a data processing unit for decoding into a readable format.

Further in accordance with the above embodiment, an interface unit is connected to the tag reader for interrogating each column of the tag reader memory by providing the interrogating signals as a plurality of output voltages. The interface unit retrieves the signals responsive to the interrogating signals along each row of the tag reader memory in the form of decimal coded output voltages. The data processing unit is connected to the interface unit for receiving the coded information via the decimal coded output voltages from each row and for decoding the information.

Still, further in accordance with the above embodiment, the interface unit includes a column driver which is operative to interrogate the coded information in the tag reader memory by sequentially applying the output voltages to each column. The column driver includes a plurality of low voltage amplifiers arranged in parallel drive channels which provide the output voltages in operative response to input signals from the data processing unit. A data input/output circuit in the interface unit directly receives the decimal coded output voltages from the tag reader memory column-by-column and enters the coded information via the decimal coded output voltages into the output stage of the data processing unit for decoding into a readable format as to be briefly described hereinafter.

Figure 2:
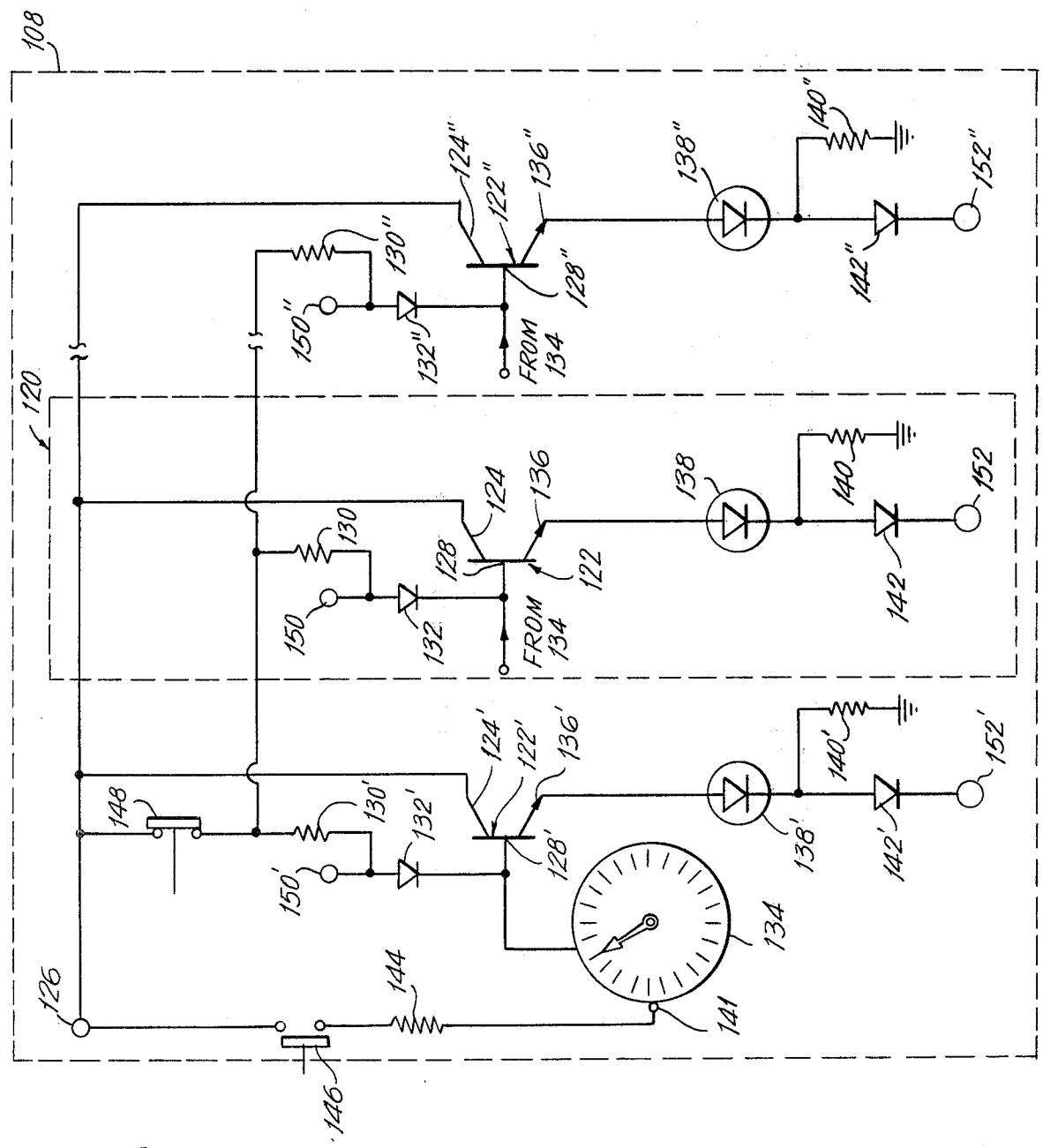

The above brief description as well as further objects, features, and advantages of the present invention will be more fully understood by reference to the following detailed description of a presently preferred but nonetheless illustrative interface unit in accordance with the present invention when taken in conjunction with the accompanying drawings, wherein:

FIG. 1 is a block diagram of a tag reading system for reading and decoding information encoded on a garment tag in binary code by punched openings, and showing the use of an interface unit having a column driver and one or more data input/output circuits to permit the direct communication between a data processing unit and a plurality of tag readers;

FIG. 2 is a circuit diagram of the column driver in the interface unit, as illustrated in FIG. 1, showing a plurality of low voltage amplifiers connected in parallel drive channels, each drive channel providing an output voltage in response to the data processing unit for interrogating one column in the memory of the tag reader; and FIG. 3 is a circuit diagram of the data input/output circuit in the interface unit, as illustrated in FIG. 1, which directly receives the interrogated coded information as decimal coded output voltages from the memory of the tag reader along each row and directly enters the information via the decimal coded output voltages into the data processing unit for decoding into a readable format.

Referring to the block diagram of FIG. 1, a garment tag reading system 100 is shown for reading and decoding information encoded as punched openings on a conventional garment tag. The tag reading system 100 includes an interface unit 102, a data processing unit 104, such as an IBM Series/1 computer, and one or more tag readers 106, 106'. The interface unit 102, which includes a single column driver 108 and one or more data input/output circuits 114, 114', permits the direct communication and provides voltage-level compatability between the data processing unit 104 and the tag readers 106, 106', such as a conventional Kimball tag reader.

By way of general description of the block diagram of the tag reading system 100, the data processing unit 104 is connected in parallel to the column driver 108 by the 24 bit output data bus 110. The column driver 108 is connected in parallel to the columns in the memory of the tag readers 106, 106' by the 24 bit column data buses 112, 112'. The rows in the memory of the tag readers 106, 106' are connected in parallel at their row output terminals to one of the data input/output circuits 114, 114' by the 10 bit row data buses 116, 116'. The data input/output circuits 114, 114' are connected in parallel to the data processing unit 104 by the 10 bit data input buses 118, 118'.

In operation, the data processing unit 104 is programmed to cause a series of voltage-level increase to appear sequentially at the column driver 108 via the 24 bit output data bus 110 after the information from each garment tag has been stored in the tag reader memory. The voltage-level increases cause the column driver 108 to provide a series of amplified output voltages which appear sequentially along the 24 bit column data bus 112, 112'. The amplified output voltages are serially applied to each column in the memory of the tag readers 106, 106' to interrogate the decimal coded information stored therein, column-by-column.

The coded information is retrieved from each column of the tag reader memory as a decimal coded output voltage appearing at one of the row output terminals of the memory. The row output terminal corresponds to the numerical value in decimal code for the coded information previously stored in binary code on the garment tag. As each column of the tag reader memory is sequentially interrogated, the decimal coded output voltages from the row output terminals are directly applied, column-by-column, to the data input/output circuits 114, 114' along one of the 10 bit row data buses 116, 116'. The decimal coded output voltages are then directly entered, column-by-column, via the 10 bit data input buses 108, 108', into the data processing unit 104 where they may be stored on a floppy-disk memory and subsequently decoded into a readable format for use by the retailer.

Referring specifically to FIG. 2, the circuit for the column driver 108 will now be described. The column driver 108 includes 24 identical, parallel connected drive channels 120 of which only three are illustrated for simplicity. Each drive channel 120 is provided for interrogating one column in the memory of the tag readers 106, 106'. Each drive channel 120 includes a low voltage emitter-follower or common-collector amplifier 122. The amplifier 122 has a high input impedance and low internal resistence. Amplifier 122 is effective for coupling a high-impedance source to a low-impedance load over a wide range of frequencies.

The collector 124 of each amplifier 122 is connected to a positive supply voltage at node 126. The base 128 of each emitter-follower amplifier 122 is also connected to the positive supply voltage at node 126 through a pull-up resistor 130 in series with a first isolation diode 132. The base 128 is further connected to one of 24 positions on a rotary selector switch 134. The emitter 136 of each amplifier 122 is connected through a light-emitting diode 138 to a grounded load resistor 140. The load resistor 140 is connected in parallel with a second isolation diode 142.

A voltage input node 141 on the rotary selector switch 134 is connected to the positive supply voltage at node 126 through a current limiting resistor 144 in series with a push-to-test switch 146. The push-to-test switch 146 is mechanically connected to a second push-to-test switch 148. The second push-to-test switch 148 is connected between the positive voltage supply at node 126 and the pull-up resistor 130 for each of the drive channels 120, thereby isolating each amplifier 122 from the positive voltage supply when open.

A column input terminal 150 for each drive channel 120 is provided between the pull-up resistor 130 and the first isolation diode 132. Each column input terminal 150 is connected to a collector of a transistor (not shown) within the output stage of the data processing unit 104 via the data processing units output terminals and the 24 bit output data bus 110. A column output terminal 152 is provided for each drive channel 120 in series with the second isolation diode 142. As each drive channel 120 includes a column output terminal 152 connected directly to one of the 24 column in the memory of the tag readers 106, 106', the column driver 108 can be easily adapted to interrogate either a larger or smaller memory by the addition or elimination of one or more drive channels 120. Referring to FIG. 3, the circuit for one of the two identical data input/output circuits 114, 114' will now be described. Each data input/output circuit 114, 114' includes ten row input terminals 154 connected in parallel to one of ten identical transmitting circuits 156 and to one row in the memory of the tag readers 106, 106'. Each transmitting circuit 156 includes a light-emitting diode 158 in series with a grounded resistor 160 having a capacitor 162 bridged thereacross. Each of the row output terminals 164 are respectively connected to one transmitting circuit 156 between the light-emitting diode 158 and the grounded resistor 160, such as at node 166.

One data input/output circuit 114, having ten transmitting circuits 156, is required for each ten rows in the memory of the tag reader 106 to receive the information stored therein in decimal code. When multiple tag readers are interrogated, multiple data input/output circuits 114, 114' are therefore required. However, it is necessary to multiply the column driver 108, as all of the respective columns in each memory of the tag readers 106, 106' are connected in parallel via the 24 bit column data buses 112, 112' to the single column driver.

The specific operation of the interface unit 102 within the tag reading system 100 will now be described with reference to the circuits illustrated in FIGS. 2 and 3. A tag, such as a garment tag, having coded information permanently stored thereon in binary code by punched openings, is inserted into tag reader 106. Tag reader 106, such as Kimball tag reader, reads the punched openings, converts the binary coded information into decimal code, and stores the information in the 24 column by 10 row electromechanical memory by closure of selected relay contacts to form connections between each column and the row corresponding to the numerical value of the information in decimal code as previously described.

The data processing unit 104 is initially programmed to have its output terminals, which are connected to the base 128 of amplifiers 122 via the column input terminals 150, to float at a voltage-level below the turn-on voltage of each amplifier 122. After each tag has been read and the information stored in the tag reader memory, each amplifier 122 is serially turned-on. The output stage of the data processing unit 104 causes each base 128 to rise above the saturation voltage of each amplifier by the base connection to the positive supply voltage at node 126 through the pull-resistor 130. The turning on of each amplifier 122 in series causes a current to flow through each light-emitting diode 138, lighting it up and visually indicating the presence of an output voltage. The resulting voltage drop across each load resistor 140 will serially appear as an amplifier output voltage at each of the column output terminals 152.

Each of the column output terminals 152 is connected to one column within the memory of the tag readers 106, 106' by the 24 bit column data buses 112, 112'. The coded information stored in each of the 24 columns of the memory is accordingly interrogated column-by-column. As an amplified output voltage appears at a column output terminal 152, a current flows through one column in the memory and appears at one of the ten row output terminals of the tag reader as a decimal coded output voltage. In this manner, each column of the tag reader memory is serially interrogated to retrieve the coded information from the memory as a decimal coded output voltage. The decimal coded output voltages from the row output terminals are directly applied to the row input terminals 154 of the data input/output circuit 114 by the 10 bit row data bus 116.

The presence of a decimal coded output voltage appearing at the row input terminals 154, causes a current to flow through a respective transmitting circuit 156 and causes the light-emitting diode 158 to light up, visually indicating the presence of the decimal coded output voltage. The capacitor 162, being bridged across resistor 160, eliminates electrical background noise as a result of the electrical contacts and electromechanical construction of the memory. The voltage drop across resistor 160 will appear at one of the row output terminals 164, which is connected to one of the input terminals of the data processing unit 104 by the 10 bit data input bus 118. The data processing unit 104 receives the decimal coded output voltages from each column of the memory in a 1 column by 10 row matrix, thereby conserving memory space within the data processing unit. As each column of the memory of the tag readers 106, 106' is interrogated, the coded information stored therein is entered into the memory of the data processing unit 104 through one of the data input/output circuits 114, 114'. The data processing unit 104 can now decode the decimal coded output voltages into a readable and useful format for the retailer.

As previously described, the decimal coded output voltages from each garment tag are entered into the input stage of the data processing unit 104, such as IBM Series/1 computer. The data processing unit 104 is programmed to store the decimal coded output voltages as they are received at its input stage in a buffer memory. The buffer memory has been assigned a dedicated space for the storage of the coded information from six garment tags. Once the coded information from the six garment tags have been stored in the buffer memory, the data processing unit 104 reads the information out of the buffer memory and onto a diskette or floppy-disc for permanent storage. The data processing unit continues to store the coded information from the garment tags within the buffer memory and to transfer the information to the diskette in this manner. After the information from the garment tags have been stored on the diskette or when the storage capacity of the diskette has been reached, the diskette can be processed by the data processing unit to decode the stored information. Further, the information may be analyzed by programs within the data processing unit to provide the retailer with a variety of information, such as identification of slow moving garments, sales volumes of a garment at different geographical locations, etc., in addition to forming market analysis and providing other merchandising data to aid the retailer. The decoded and anaylzed information is provided to the retailer in a conventional printout in permanent format. Although the data processing unit has been described as being programmed in the manner of the above embodiment, it is to be understood that one skilled in the art may program the data processing unit in any desired manner to provide the retailer with the information required and to perform any market analysis programs desired.

The interface unit 102 is designed to additionally provide a diagnostic function, such that the source of certain malfunctions in the tag reading system 100 can be readily determined. This function is particularly important when the interface unit 102 is used between tag readers 106, 106' as supplied by one manufacturer, and a data processing unit 104 as supplied by another manufacturer. In such a case, an accurate determination of which of the two systems is malfunctioning can greatly facilitate repairs.

The diagnostic function will now be described with reference to the test circuit shown on the left side of FIG. 2. With the data processing unit 104 in a powered-down state, the voltage clamp caused by the output stage of the data processing unit is removed from each base 128 of each amplifier 122 by actuating the first and second push-to-test switches 146, 148. The first and second push-to-test switches 146, 148 are mechanically connected to one another so that when the push-to-test switch 145 is closed, the push-to-test switch 148 opens, and the positive return for the pull-up resistor 130 is disconnected from the positive supply voltage at node 126.

The positive supply voltage is now available directly to the base 128 of each amplifier 122 through the rotary selector switch 134 and the current limiting resistor 144. The selector switch 134 is turned to the desired drive channel 120 the operator wishes to test. The amplifier 122 of the corresponding drive channel 120 is turned-on as its base voltage reaches the saturation voltage and produces a test output voltage to interrogate the corresponding column within the memory of the tag readers 106, 106'. Each column in the memory may be manually interrogated in this manner to isolate malfunctions in each column of the tag readers 106, 106' versus the data processing unit 104, which remains in a powered-down state.

The test circuit uses the first isolation diode 132 to prevent interaction between the drive channels 120 when supplying a voltage to the base 128 of each amplifier 122 using rotary switch 134. Similarly, the second isolation diode 142 prevents interaction between the columns of the memory of the tag readers 106, 106' when being interrogated. Further, the second isolation diode 142 also prevents interference with the Kimball tag reader's internal error-detection circuitry which provides a detection voltage of about 65 volts. The detection voltage would be otherwise clamped to the low voltage appearing at the column input terminals 150 of each driver channel 120 in the absence of the isolation diode 142.

As described according to the present invention, the interface unit 102, under the control of the data processing unit 104, can interrogate the tag reader in a column-by-column basis that conserves CPU time and memory space. The column-by-column interrogation permits interrogation of the first column of the memory in the tag reader for early detection of a control or a flag signal which would command the data processing unit 104 to switch to an appropriate branch or subroutine or perform some other function. There is no limit to the number of tag readers that can be provided and simultaneously interrogated. The interface unit 102 is constructed of a minimum number of active elements and thereby enhances its reliability and simplifies potential repairs. The direct visual indication of all the amplified output voltages appearing in the column driver 108 and the decimal coded output voltages appearing in the data input/output circuits 114, 114', greatly aids the operator in maintaining the system free from errors.

Further, the interface unit 102 simplifies fault isolation by providing a test circuit for manually scanning the memory of the tag reader with the data processing unit in a powered-down state. The interface unit 102 utilizes voltage and current levels which provide reliable ccurrent circuits through the relay contacts of the memory even when pitted, worn or dirty from continous use, and has impedance levels for reliable data transmission in electrically noisy environments.

The tag reading system 100 has been described as interrogating the tag reader memory, column-by-column. However, it is to be understood to one having ordinary skill in the art, that the tag reading system 100 may be operated to interrogate the tag reader memory, row-by-row, utilizing the interface unit 102 according to the present invention. The data processing unit 104 will accordingly be programmed to process the coded information in the manner it is received from the tag reader memory via the interface unit 102.

Although the invention herein has been described with reference to particular embodiments, it is to be understood that these embodiments are merely illustrative of the principles and the application of the present invention. Thus, it is to be understood that numerous modifications may be made in the illustrative embodiments and other arrangements may be devised without departing from the spirit and scope of the present invention as defined by the appended claims.

What is claimed is:

1. An interface unit for transferring coded information on a real time basis directly from a tag reader having a memory arranged in a preselected number of columns and rows and having a plurality of column terminals and row terminals for reading and storing information from encoded garment tags and a data processing unit which stores the transferred coded information, said interface unit being coupled to said data processing unit by an output data bus and a data input bus, said interface unit being coupled to said tag reader by a column data bus coupling said interface unit in parallel to the column terminals in the tag reader memory and a row data coupling the row terminals in the tag reader memory in parallel to the interface unit, said interface unit comprising means responsive to a sequential series of voltage level increases received over said output data bus in response to encoded information from the garment tag being stored in the tag reader memory for producing a sequence of amplified output voltages sequentially on said column data bus for serial application to each column in the tag reader memory, and data input/output means responsive to decimal coded voltages received by said interface unit on said row data bus and produced by the memory in the tag reader responding to said output voltages to cause decimally coded voltages to appear at the row output terminals of said tag reader sequentially as each column in said tag reader is interrogated for transferring said information by said data input bus on a real time basis to said data processing unit for storage therein.

2. The interface unit of claim 1 further including a sequential switching device and plurality of parallel-connected drive channels equal in number to the columns in the tag reader memory, each drive channel having a column input terminal and a column output terminal, including a low voltage emitter-follower amplifier having a high input impedence and low internal resistance to couple a high impedance source to a low impedance load over a wide frequency range, each of said emitter-follower amplifiers including a series connected isolation diode and pull-up resistor connected between the base and a source of potential, the base of each transistor also being connected to one of a plurality of positions of said sequential switching device, one of said output voltages appearing on the output data bus being applied to each column input terminal at the junction of each series connected isolation diode and pull-up resistor, each column output terminal being coupled via the column data bus to one column in the memory of the tag reader.

3. The interface of claim 2 wherein said data input/output means includes a plurality of identical transmitting circuits equal in number to the rows in the memory of the tag reader, each transmitting circuit including a light emitting diode connected in series with a grounded resistor having a capacitor bridge thereacross, each of said transmitting circuits having an input terminal coupled to said row data bus to receive information from one row in said tag memory and having an output terminal coupled to said data input bus to transmit such information to the data processing unit.

4. The interface unit of claim 3 wherein the output terminal of each transmitting circuit is at the junction of said light emitting diode and resistor.

5. The interface unit of claim 2 wherein said isolation diode has an anode and cathode, said cathode being connected to the base of said emitter-follower amplifier and said pull-up resistor having first and second terminals, said first terminal being connected to the anode of said isolation diode and the second terminal being connected to the battery potential.

6. A system for transferring coded information on a real time basis comprising a tag reader including a memory arranged in a preselected number of columns and row terminals, means for reading information encoded on garment tags and transferring said information to appropriate columns and rows in said memory, a data processing unit for storing coded information, an interface unit coupled to said data processing unit by an output data bus and an input data bus and coupled to said tag reader by a column data bus coupling said interface unit in parallel to the column terminals in the tag reader memory and a row data bus coupling the row terminals in the tag reader memory in parallel to the interface unit, said interface unit including means responsive to a sequential series of voltage level increases received over said output data bus in response to encoded information from the garment tag being stored in the tag reader memory for producing a sequence of amplified output voltages sequentially on said column data bus for serial application to each column in the tag reader memory, and data input/output means responsive to decimal coded voltages received by said interface unit on said row data bus produced by the memory in the tag reader responding to said output voltages to cause decimally coded voltages to appear at the row output terminals of said tag reader sequentially as each column in said tag reader is interrogated for transferring said information by said data input bus on a real time basis to said data processing unit for storage therein.

* * * * *